March 24, 1970 A. J. L. CHAMBET-FALQUET ET AL 3,503,051
WORD ORGANIZED MEMORY COMPRISING FLIP-FLOPS WITH RESET MEANS ASSOCIATED WITH EACH FLIP-FLOP IN THE FORM OF A CLEARING LINE GENERATOR COUPLED TO THE EMITTER OF ONE OF THE TRANSISTORS OF THE FLIP-FLOP
Filed July 12, 1966
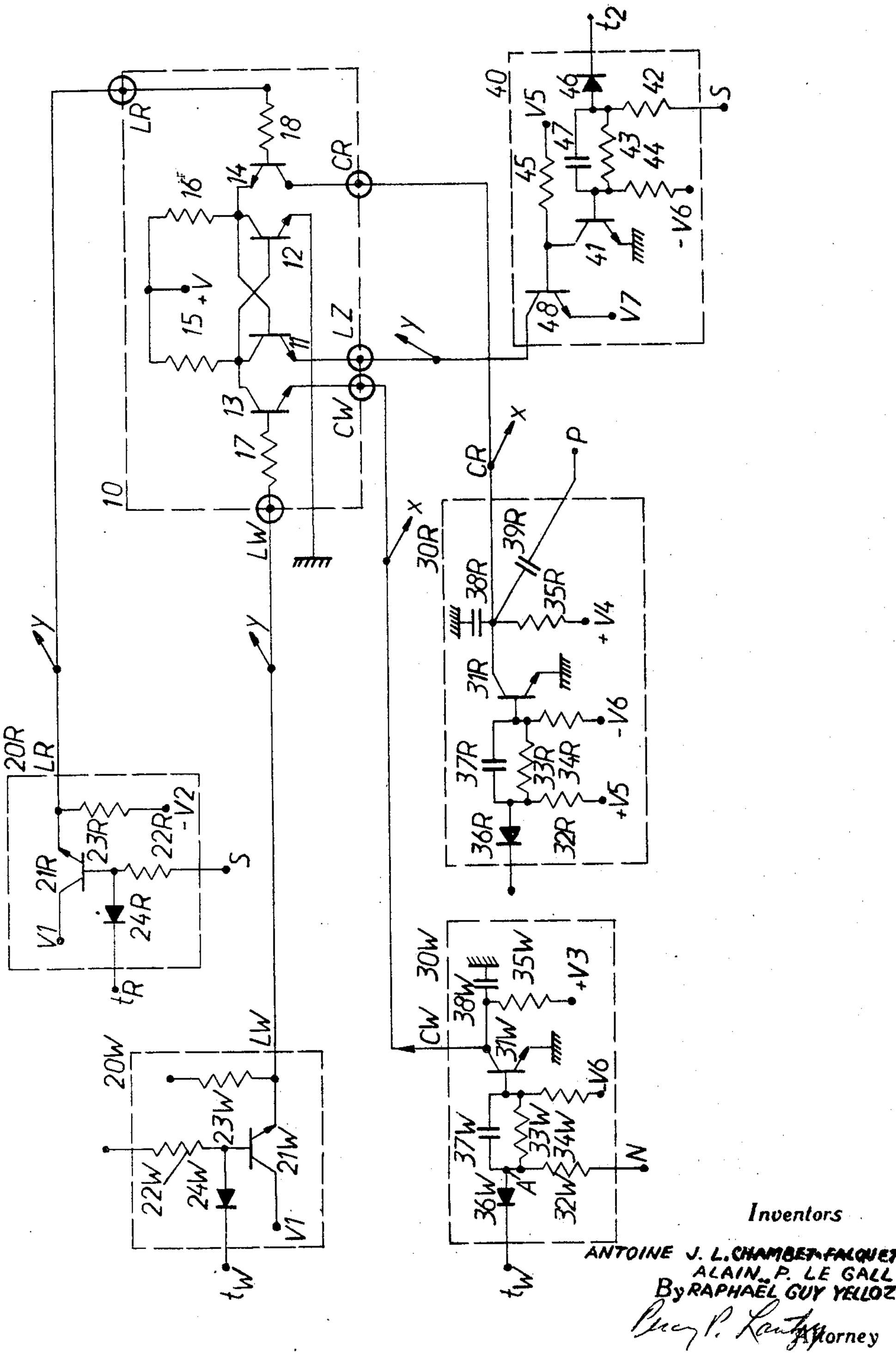
Inventors
ANTOINE J. L. CHAMBET-FALQUET
ALAIN P. LE GALL
By RAPHAEL GUY YELLOZ
Attorney

United States Patent Office — 3,503,051 — Patented Mar. 24, 1970

3,503,051

WORD ORGANIZED MEMORY COMPRISING FLIP-FLOPS WITH RESET MEANS ASSOCIATED WITH EACH FLIP-FLOP IN THE FORM OF A CLEARING LINE GENERATOR COUPLED TO THE EMITTER OF ONE OF THE TRANSISTORS OF THE FLIP-FLOP

Antoine Jean Louis Chambet-Falquet, Romainville, and Alain Pierre Le Gall and Raphael Guy Yelloz, Paris, France, assignors to International Standard Electric Corporation, New York, N.Y., a corporation of Delaware Filed July 12, 1966, Ser. No. 564,687
Claims priority, application France, July 13, 1965, 24,412
Int. Cl. G11b *9/00*
U.S. Cl. 340—173 1 Claim

ABSTRACT OF THE DISCLOSURE

A unit storage cell comprises a transistor bistable and two associated transistors which control respectively the write and read operations in a word-organized memory. The coincidence voltage writing is made by saturating one of these associated transistors. The linear selection for the readout and the resetting to zero are made respectively by saturating the other transistor, and by opening the emitter-to-ground connection in one of the transistors of the bistable.

The present invention concerns a matrix memory equipped with unit cells constituted by bistable circuits or "flip-flops."

It is well known that any element possessing two stable operation states can be used as a memory element. In the present state of the art, the most common element is the magnetic core with a rectangular hysteresis loop but, though it enables the implementation of memories with a very large capacity, the latter have some inconveniences. In particular, they must be supplied with high-level selection currents produced by high voltage sources. Consequently the selection circuits cannot be directly driven by a logic unit implemented with integrated circuits for which the usual currents are, at the most, some tens of milliamperes and the voltage is some volts.

Another well-known memory unit element is the flip-flop which necessitates very low driving energy and whose switching time can be a few tens of nanoseconds. Such a bistable circuit equipped with semi-conductor active elements such as planar epitaxial transistors or field-effect transistors can be easily implemented with integrated circuits.

More precisely, one can obtain on the same piece of semi-conductor material a certain number of flip-flops which enable the binary digits constituting a word or part of a word to be stored and this "elementary memory" can be fixed, for instance, on a support constituted by a double layer printed circuit, one of the layers being reserved for the line wires and the other for the column wires. The wiring of such a memory, therefore, simply consists in locating the elementary memories in the places reserved for them on the printed circuit and soldering them. Furthermore the sensing operation, which consists in the measurement of the voltage present on one of the electrodes of a transistor, is non-destructive which is an advantage in many cases.

The aim of the present invention is therefore to obtain a high-speed low-consumption memory which could be implemented with integrated circuits.

The present invention will be particularly described with reference to the accompanying drawing which represents a unit memory cell and the driving circuits related thereto when it is part of a word-organized matrix memory.

By way of a non-limitative example a unit memory cell 10 comprising transistors 11 to 14 and resistors 15 to 18 is shown. The conductivity type of these transistors is such that they ae conducting when their base voltage is more positive than their emitter voltage by a quantity at least equal to the threshold voltage.

Transistors 11, 12 and resistors 15, 16 constitute a flip-flop of a well-known type which is supplied by a positive voltage of amplitude V. It will be assumed that this flip-flop is in the 1 state when transistor 12 is blocked and that it is in the 0 state when transistor 11 is blocked.

Transistors 13 and 14 are used for controlling the state changes of the flip-flop and for effecting the readout.

To study the operation of cell 10, it will be assumed that, at rest, the outputs LW, LR and brought at a negative potential V2, the ouputs CR, LZ at the ground potential and the output CW at a positive potential V3.

In these conditions, transistors 13 and 14 are blocked and the collectors of transistors 11 and 12 are isolated from the outputs of the memory cell.

To write a digit 1, i.e. to set the flip-flop in the 1 state, input LW is set at a positive voltage V1 and input CW at the ground voltage so that transistor 13 saturates. Transistor 12 base is then set at a voltage only slightly different from that of the ground, so that this transistor blocks. To sense the information stored in the flip-flop, one applies a positive voltage V1 to input LR in order to saturate transistor 14 and a positive voltage V4 on input CR. If, whatever the state of the flip-flop may be, voltage V4 is slightly higher than transistor 12 collector voltage and a current flows in transistor 14. The value of this current is smaller when the flip-flop is in the 1 state than when it is in the 0 state and it constitutes the readout information. One will note that the sensing is non-destructive.

Finally, to reset the flip-flop in the 0 state, one momentarily inserts a very high impedance at the LZ output, so that transistor 11 collector current is practically null. This transistor is therefore blocked so that the memory cell is cleared.

Table I below represents, on lines 1 to 5, the values of the voltages applied to the circuit 10 terminals in the various operation phases which have just been studied and to which columns *a*, *b*, *c*, *d* are assigned. In order to make the table easier to read, one has not shown, in columns *b*, *c*, *d*, the voltages which remain unchanged during the operation considered and which are the rest voltages shown, on the corresponding lines of column *a*.

TABLE I

| | | a | b | c | d |
|---|---|---|---|---|---|
| | | Rest | Write | Read | Clearing |
| 1 | LW | —V2 | V1 | | |
| 2 | CW | V3 | 0 | | |
| 3 | LR | —V2 | | V1 | |
| 4 | CR | 0 | | V4 | |
| 5 | LZ | 0 | | | Disconnected. |
| 6 | Signal | | tW | tR | tZ. |

The unit memory cell 10 whose mode of operation has just been described may equip a matrix memory comprising *x* lines and *y* columns. In such an assembly, the selection voltages applied to the inputs of each unit element 10 are supplied by the following line and column voltage generators:

Write line voltage generators 20W whose number is *x*, each of said generators supplying in parallel the *y* unit cells of a line. On the diagram, one has shown one of these generators 20W and the arrow "*y*" joined to its output wire LW symbolizes the parallel supply or "multiplexing" of the *y* cells of the line;

Read line voltage generators 20R which are connected to the inputs LR of the memory elements in the same way as the generators 20W;

Clearing line voltage generators 40 which are connected to the inputs LZ as are the generators 20W and 20R. This mode of applying the clearing signal means that the memory studied by way of an example is word-organized, the various digits constituting a word being written in the cells placed on a line;

Write column voltage generators 30W whose number is *y*, each of them being multiplexed over the *x* inputs CW of the cells of a column;

Read column voltage generators 30R which are connected to the inputs CR of the memory cells as are the generators 30W.

These various generators are controlled by three types of signals:

(a) Timing signals: these signals referenced *t*W, *t*R, *t*Z (see Table I, line 6) define the time intervals reserved for the writing, for the sensing and for the clearing of the memory cells assigned to a word;

(b) Line selection signal S: this signal is supplied by a decoder—which is not shown in the figure—to the line selected at one of the times *t*W, *t*R or *t*Z;

(c) Information signal N: this signal is applied, upon a writing at time *t*W, to the write columns serving the cells of the selected line in which a digit 1 must be stored.

These five signals are supplied in the form of positive signals of amplitude V5 and, in the absence of a signal the coresponding input is brought at the ground potential.

In later descriptions, it will be stated that a transistor is saturated when its base to emitter voltage is higher than the threshold voltage and when a collector current flows in the forward direction. The voltage drop in the emitter-base junction is then noted V*be* and the voltage drop between the collector and the emitter is noted V*ce*.

A V*be* or V*ce* voltage related to a given transistor, transistor 21W for instance, will be referenced V*be* (21W) or V*ce* (21W).

When examining the drawing, one will note that the voltages applied to the wires are supplied by transistors so that the zero volt voltages as indicated in Table I are in fact V*ce* voltages (transistors 31W, 31R, 48).

The operation of the matrix memory under the control of these generators will now be described starting with the write operation.

Circuit 20W comprises transistor 21W in an emitter-follower circuit, resistances 22W, 23W and diode 24W.

Resistor 22W and diode 24W form and AND circuit which controls the saturation of transistor 21W for the logical condition $S\times tW$, the line LW then being set at the potential V1−V*ce* (21W). In all other cases, this transistor remains conducting and the values of resistors 22W, 23W and of potentials V1, V2 are selected in such a way that line LW be set at a slightly negative potential ensuring the blocking of transistor 13.

It will be noted that the values of voltage V5 and of resistance 22W must be such that the emitter current of transistor 21W may eventually ensure, for the condition $S\times tW$, the simultaneous saturation of the *y* transistors 13 associated to line LW.

Circuit 30W comprises transistor 31W in common emitter circuit, resistors 32W to 35W, diode 36W and capacitor 37W. A capacitor 38W which symbolizes the stray capacity distributed on the column supplied by this generator is also shown.

As in the line generators, components 32W and 36W form an AND circuit, so that point A is always at the ground potential except when signals N and *t*W are simultaneously present (logical condition $N\times tW$) in which case this point is brought at a positive potential.

On the other hand, the lower end of resistor 34W is brought at a negative voltage V6 which is so selected, as are resistances 33W and 34W, that transistor 31W is saturated only when signal *t*W and N are simultaneously present. In this case, column CW is set at voltage V*ce* (31W) and, when the transistor is blocked, it is set at a positive potential V3, through resistance 35W.

From the description which has just been given, one can see that:

(a) For condition $\overline{N}\times\overline{S}\times\overline{tW}$: wire LW is set at a negative potential and wire CW is set at positive potential V3, so that the transistor 13 of the memory cell placed at the intersection of these two wires is blocked;

(b) For conditon $\overline{N}\times S\times tW$ (line LW is selected but column CW is not selected): the transistor 13 of the above defined cell remains blocked if $$V1-Vce\ (21\mathrm{W})<V3+Vbe(13) \qquad (1)$$

(c) For condition $N\times\overline{S}\times tW$ (line LW is not selected, column CW is selected): the transistor 13 remains blocked as the line voltage is negative and the column voltage is equal to V*ce* (31W);

(d) For condition $N\times S\times tW$ (line LW and column CW are selected): the transistor 13 saturates if:

$$V1-Vce(21\mathrm{W})>Vbe(13)+Vce(31\mathrm{W}) \qquad (2)$$

It then provokes the blocking of transistor 12 and, as was seen in the description of the unit cell, the writing of a digit 1.

The column stray capacity 38W must be charged between two successive write operations or else it will provoke a false selection when a zero is stored immediately after a 1. To ensure this charge one choses the value of voltage V3 and of resistance 35W in such a way that the charge is complete in the time interval between two successive *t*W signals.

The sensing generators 20R and 30R are identical to generators 20W and 30W respectively and the corresponding components bear the same reference numbers in the two types of generators followed by the letter "R."

In the sense line generator, transistor 21R sets wire LR at potential V1−V*ce*(21W) for condition $S\times tR$.

In the sense column generator 30R, resistors 32R and 35R are set at potential V5 and at a positive potential V4 respectively. On the other hand, the command signal, referenced $\overline{tR}$ on the figure, is the complement of signal *t*R, i.e. the cathode of diode 36R is permanently set at potential V5 except for a readout time during which it is set at the ground potential. Consequently, transistor 31R is permanently saturated, point C being set at potential V*ce* (31R), except for time *t*R during which the potential of this point takes on a more positive value which will be defined below.

Therefore one can see that:

(a) For condition $\overline{S}\times\overline{tR}$; the wire LR is set at a negative potential and the transistor 14 is blocked as its emitter is connected to the collector of transistor 12 which is always set at a positive potential;

(b) For condition $S\times\overline{tR}$ (a complete memory line receives a selection signal during a time period which is not reserved for sensing). The base-emitter junctions of the transistors 14 of the memory cells associated to this line are conducting if one has:

$$V1-Vce(31R)>Vbe(11)+Vbe(14) \qquad (3)$$

but the transistors remain blocked because their collectors are at potential V*ce* (31R);

(c) for condition $S\times tR$ (a memory line is selected for sensing): the transistors 14 of the memory cells associated to this line are saturated if voltage V4 is positive enough with respect to the most positive potential at which transistor 12 collector can be set.

As was seen previously, the flip-flop is in the 1 state when transistor 12 is blocked and in the 0 state when it is saturated. Therefore the source of potential V4 delivers a current which flows through resistor 35R, transistor 14 and which flows to the ground either through the base-emitter junction of transistor 11 (flip-flop in the 1 state) or through the collector-emitter space of transistor 12

(flip-flop in the 0 state). The potential of the point C, in the circuit 30R, then reproduces transistor 12 collector potential, but for the potential difference $Vce$ (14). In other words, point C is at potential $Vce$ (12)+$Vce$ (14) when the flip-flop is in 0 state and at potential $Vbe$ (11)+$Vce$ (14) whent it is in the 1 state.

As was seen above, point C potential is equal to $Vce$ (31R) at rest and it increases when a readout takes place. The readout signal is collected at point P for instance, the reading pulse being transmitted through capacitor 39R. As $Vbe$ (11)>$Vce$ (11), the readout signal of a digit 1 presents a greater amplitude than the readout signal of a digit 0.

Generator 30R whose operation has just been described has the function of supplying, upon a readout, the charge current of the column stray capacity 38R so that this current is not required from the flip-flop and, after this operation, to discharge this capacity to the ground when transistor 14 becomes blocked so that the discharge current does not disturb the operation of the flip-flop. The value of resistor 35R and voltage V4 are selected in such a way that the charging of the stray capacity is terminated in a fraction of time $t$R in order for the output signal to be available during a significant time.

If the transistors used in this memory are normal silicon transistors of the "diffused" or "planar epitaxial" types, the values of $Vbe$ and $Vce$ voltages are about 0.6 volt and 0.2 volt respectively.

Finally the clearing circuit 40 has a structure identical to that of circuit 20W but in addition it comprises a transistor 48. The corresponding components of these two circuits have references with the same unit digit.

The command signals of this circuit are S and $t$Z signals and, when condition $S \times tZ$ is established, transistor 41 is saturated and transistor 48 (whose emitter is set at a low negative voltage V7 of about 0.2 volt) is blocked. If one assumes, as previously, that the collector-emitter voltage drop of the transistor 41 when saturated is 0.2 volt and that the threshold of the base-emitter junction of transistor 48 is 0.6 volt, one can see that this transistor is in fact blocked although its emitter is slightly negative.

When condition $S \times tZ$ is not fulfilled, collector current of transistor 48 feeds the $y$ flip-flops in the line which are in the 1 state and the negative voltage V7 compensates for the collector-emitter voltage drop of this transistor which is equal to $y \times RS$, with RS designating the transistor saturation resistance. When condition $S \times tZ$ is established, the emitters of all transistors 11 placed on the selected line are practically disconnected and, as was seen previously, all the flip-flops of the line go to the 0 state.

The matrix memory which has just been described can be implemented by grouping either unit cells or elementary memories implemented with the integrated circuits technique and comprising $N = xo \times yo$ unit cells each; $xo$ designating the number of unit elements appertaining to a memory line and $yo$ the number of lines.

On referring to the figure, one sees that each elementary memory will comprise, for its connection to the remainder of the circuit:

a ground wire
a power supply wire conected to voltage source V
$2xo$ line selection wires
$2yo$ columnn selection wires
$yo$ wire for resetting.

The total number of outputs of an elementary memory is therefore:

$N = 3yo + 2xo + 2$.

For instance for:

| | | |
|---|---|---|
| $xo=4$ | $yo=3$ | $N=19$ |
| $xo=3$ | $yo=4$ | $N=20$ |
| $xo=8$ | $yo=4$ | $N=30$. |

While the principles of the above invention have been described in connection with specific embodiments and particular modifications thereof it is to be clearly understood that this descritpion is made by way of example and not as a limitation of the scope of the invention.

In particular, one can use transistors with an inverse polarity by inverting the connections of the diodes and the polarity of the power supplies.

What we claim is:

1. A word organized memory having X lines and Y columns comprising:

X.Y unit memory cells, each cell including a pair of cross-coupled transistors (11, 12) and two associated transistors (13, 14), said transistor (13) having its collector connected to the collector of transistor (11) and said transistor (14) having its emitter connected to the collector of transistor (12), a base electrode resistor (17) coupled to said transistor (13) and a base electrode resistor (18) coupled to said transistor (14), said transistor (11) is rendered conductive, thereby representing a 1 state for storing an information by applying write voltages to said base electrode resistor (17) and directly to the emitter electrode of transistor (13), so that transistor (13) saturates and controls the setting of the cross-coupled transistors, the state of said cross-coupled transistors is non-destructively sensed by applying a sense voltage to said base electrode resistor (18) to saturate transistor (14) whatever the state of the cross-coupled transistors, and the voltage at the collector of transistor (14) characterizes the state of the cross-coupled transistors, such that the state 1 represents a greater amplitude than a state 0;

means for effecting a coincident signal selection of the cell associated to a given line and column wherein the information is stored, including a write line generator connected to each base resistor (17) of all cells of the given line and a write column generator directly connected to each emitter of transistor (13) of all cells wherein the information must be stored;

means for effecting a linear selection for reading a word, including a read line generator connected to each base resistor (18) of all the cells connected to the given line, and a read column generator connected to each collector of transistor (14) of all cells associated with the given column, forming the state sense line; and means for rendering transistor (11) non-conductive and transistor (12) conductive, thereby resetting the cross-coupled transistors to the zero state, including a clearing line generator having a transistor (48) with its collector directly connected to the emitter of transistor (11) of all cells associated with the given line, such that a very high impedance is reflected to the emitter of transistors (11) with the collector current approaching zero, and transistor (11) becomes blocked and the memory cell cleared.

References Cited

UNITED STATES PATENTS 3,177,374 4/1965 Simonian -------- 340—173 X
3,259,757 7/1966 Lavin ------------ 307—291 X
3,292,014 12/1966 Brooksby --------- 307—291 X
3,218,613 11/1965 Gribble ------------ 340—173
3,364,362 1/1968 Mellott ------------ 340—173

TERRELL W. FEARS, Primary Examiner

H. L. BERNSTEIN, Assistant Examiner

U. S. Cl. X. R.

307—238, 291